(12) United States Patent
Kalyuzhny et al.

(10) Patent No.: US 7,973,537 B2
(45) Date of Patent: Jul. 5, 2011

(54) CORRECTIVE DEVICE PROTECTION

(75) Inventors: Aaron Kalyuzhny, Haifa (IL); John C. McCall, Sussex, WI (US); Timothy Robert Day, Racine, WI (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 12/840,378

(22) Filed: Jul. 21, 2010

(65) Prior Publication Data

US 2010/0301874 A1 Dec. 2, 2010

Related U.S. Application Data

(62) Division of application No. 12/568,815, filed on Sep. 29, 2009, now Pat. No. 7,786,735, which is a division of application No. 11/250,615, filed on Oct. 17, 2005, now Pat. No. 7,616,005.

(60) Provisional application No. 60/619,032, filed on Oct. 18, 2004.

(51) Int. Cl.
*G01R 31/02* (2006.01)
(52) U.S. Cl. ........................................ 324/521; 324/522
(58) Field of Classification Search ................ 324/521, 324/522, 86; 361/15, 76
See application file for complete search history.

(56) References Cited

U.S. PATENT DOCUMENTS

| | | | |
|---|---|---|---|
| 2,942,153 A | 6/1960 | Schultze et al. | |
| 4,669,024 A * | 5/1987 | Stacey | 361/85 |
| 4,998,098 A | 3/1991 | Schweitzer | |
| 5,670,864 A * | 9/1997 | Marx et al. | 323/211 |
| 5,883,796 A | 3/1999 | Cheng et al. | |
| 6,246,332 B1 | 6/2001 | Hubbard | |
| 6,308,140 B1 | 10/2001 | Dowling et al. | |
| 2003/0011355 A1 | 1/2003 | Skerritt et al. | |
| 2004/0141265 A1 | 7/2004 | Angle et al. | |

OTHER PUBLICATIONS

Office Action for corresponding Chinese Application No. 2005800393673, mailed Apr. 3, 2009, and an English translation thereof, 15 pages.
Office Action for corresponding Chinese Application No. 2005800393673, mailed Oct. 30, 2009, with English-language translation thereof, 10 pages.
PCT International Search Report (PCT/US 05/37000), mailed May 14, 2007, 2 total pages.
PCT Written Opinion of the International Search Authority (PCT/US 05/37000), mailed May 14, 2007, 6 pages.
Examination Report for corresponding Australian Application No. 2005295599, mailed Jul. 15, 2009, 3 pages.

* cited by examiner

*Primary Examiner* — Vincent Q Nguyen
(74) *Attorney, Agent, or Firm* — Fish & Richardson P.C.

(57) ABSTRACT

A control system for an electrical power system includes an electrical corrective device, a voltage measuring device coupled to each phase of the electric power system, a current measuring device connected between each phase of the electric power system and the electrical corrective device, and a protective device connected to outputs of the voltage measuring device and the current measuring device. The protective device includes a controller configured to detect an imbalance using the measured voltages and currents output from the voltage measuring device and the current measuring device without using or independently of other recent voltage or current measurements for other points in the electrical corrective device and independently of a neutral-ground measurement at the electrical corrective device.

13 Claims, 2 Drawing Sheets

CORRECTIVE DEVICE PROTECTION

CROSS REFERENCE TO RELATED APPLICATIONS

This application is a divisional of U.S. patent application Ser. No. 12/568,815, filed Sep. 29, 2009, now U.S. Pat. No. 7,786,735 which is a divisional of U.S. patent application Ser. No. 11/250,615, filed Oct. 17, 2005, and issued as U.S. Pat. No. 7,616,005 on Nov. 10, 2009, which claims priority from U.S. Provisional Application No. 60/619,032, filed Oct. 18, 2004. The prior applications are incorporated herein by reference in their entirety.

TECHNICAL FIELD

This document relates to protecting corrective devices in electric power systems.

BACKGROUND

Utilities often connect corrective devices such as reactor or capacitor banks to an electric power system to reduce system losses, neutralize inductive reactance, or improve voltage regulation.

SUMMARY

In one general aspect, a method is performed for detecting imbalances in an electrical corrective device connected to an electric power system. The method includes measuring a voltage of each phase of the electric power system, measuring a current between each phase of the electric power system and the electrical corrective device, and detecting an imbalance in the electrical corrective device. The imbalance is detected using the measured voltages and currents independently of other recent voltage or current measurements for other points in the electrical corrective device and independently of a neutral-ground measurement at the electrical corrective device.

Implementations may include one or more of the following features. For example, the electrical corrective device may include a reactor bank. The electrical corrective device may include a capacitor bank.

Detecting an imbalance may include determining a negative-sequence current using the measured values and comparing the negative-sequence current with a predetermined negative-sequence current calculated for an undamaged electrical corrective device.

The electrical corrective device may be shunt connected. The electrical corrective device may be ungrounded. The electrical corrective device may include a bank of elements that are arranged in a wye configuration. The electrical corrective device may be ungrounded or grounded.

The method may also include activating a switching device to isolate the electrical corrective device from the electric power system when an imbalance is detected.

Detecting the imbalance may include compensating for errors in the measured voltages and currents due to ambient temperature changes.

The method may include determining in which phase the imbalance occurs.

In another general aspect, a control system for an electrical power system includes an electrical corrective device, a voltage measuring device, a current measuring device, and a protective device. The voltage measuring device is connected to measure voltages of each phase of the electric power system. The current measuring device is connected to measure current between each phase of the electric power system and the electrical corrective device. The protective device is connected to outputs of the voltage measuring device and the current measuring device. The protective device includes a controller configured to detect an imbalance using the measured voltages and currents output from the voltage measuring device and the current measuring device independently of other recent voltage or current measurements for other points in the electrical corrective device and independently of a neutral-ground measurement at the electrical corrective device.

Implementations may include one or more of the following features. For example, the electrical corrective device may include a capacitor bank or a reactor bank. The electrical corrective device may be shunt connected. The electrical corrective device may be ungrounded. The electrical corrective device may include a bank of elements that are arranged in a wye configuration. The electrical corrective device may be grounded.

The control system may include a switching device in each phase of the electric power system, and the electrical corrective device may be connected to the switching device to activate the switching device to isolate the electrical corrective device from the electric power system when an imbalance is detected.

In another general aspect, a system for detecting imbalances in an electrical corrective device connected to an electric power system includes a means for measuring a voltage of each phase of the electric power system, a means for measuring a current between each phase of the electric power system and the electrical corrective device, and a means for detecting an imbalance. The means for detecting the imbalance uses the measured voltages and currents independently of other recent voltage or current measurements for other points in the electrical corrective device and independently of a neutral-ground measurement at the electrical corrective device.

In another general aspect, a method is performed for detecting imbalances in an electrical corrective device connected to an electric power system. The method includes measuring a voltage $V_A$, $V_B$, and $V_C$ of each phase A, B, C of the electric power system; measuring a current $I_A$, $I_B$, and $I_C$ between each phase of the electric power system and the electrical corrective device; and calculating positive-sequence, negative-sequence, and zero-sequence device currents $I_1$, $I_2$, and $I_0$, respectively, and positive-sequence, negative-sequence, and zero-sequence voltages $V_1$, $V_2$, and $V_0$, respectively, on the basis of the currents $I_A$, $I_B$, and $I_C$ and the voltages $V_A$, $V_B$, and $V_C$. The method further includes determining a predetermined negative-sequence current $I_{2un}$ of an undamaged electrical corrective device; calculating a negative-sequence current difference by comparing the calculated negative-sequence current $I_2$ with the predetermined negative-sequence current $I_{2un}$; and de-energizing the electrical corrective device if $I_2$-$I_{2un}$ exceeds a predetermined threshold.

Implementations can include one or more of the following features. For example, the predetermined negative-sequence current $I_{2un}$ may be calculated based on the positive-sequence and negative-sequence voltages $V_1$ and $V_2$, respectively, at the electrical corrective device and the positive-sequence current $I_1$ at the electrical corrective device for an ungrounded electrical corrective device.

The term $$I_{2un} = \left[ \begin{array}{c} (G_{21C} + jB_{21C})V_1 + \\ (G_{11C} + jB_{11C})V_2 \end{array} \right] \times \left| \frac{I_1}{V_1 \sqrt{G_{11C}^2 + B_{11C}^2}} \right|,$$

for an ungrounded electrical corrective device, where $$G_{11C} = \frac{V_{1C}I_{1rC} + V_{2rC}I_{2rC} + V_{2iC}I_{2iC}}{V_{1C}^2 + (V_{2rC}^2 + V_{2iC}^2)},$$

$$B_{11C} = \frac{V_{1C}I_{1iC} + V_{2iC}I_{2rC} - V_{2rC}I_{2iC}}{V_{1C}^2 - (V_{2rC}^2 + V_{2iC}^2)},$$

$$G_{21C} = \frac{I_{2rC} - G_{11C}V_{2rC} + B_{11C}V_{2iC}}{V_{1C}},$$

$$B_{21C} = \frac{I_{2iC} - G_{11C}V_{2iC} - B_{11C}V_{2rC}}{V_{1C}}.$$

and $$V_{1C} = V_{1C}, V_{2C} = V_{2rC} + jV_{2iC},$$

$$I_{1C} = I_{1rC} + jI_{1iC}, I_{2C} = I_{2rC} + jI_{2iC},$$

and where $V_{1C}$, $I_{1C}$, $V_{2C}$, and $I_{2C}$ are, respectively, a positive-sequence voltage, a positive-sequence current, a negative-sequence voltage, and a negative-sequence current that were measured when the electrical corrective device was commissioned; $I_{1rC}$, $I_{1iC}$ are, respectively, real and imaginary components of $I_{1C}$; $V_{2rC}$, $V_{2iC}$ are, respectively, real and imaginary components of $V_{2C}$; and $I_{2rC}$, $I_{2iC}$ are, respectively, real and imaginary components of $I_{2C}$.

The predetermined negative-sequence current $I_{2un}$ may be calculated based on the positive, negative, and zero-sequence voltages $V_1$, $V_2$, $V_0$, respectively, at the electrical corrective device, and the positive-sequence current $I_1$ at the electrical corrective device for a grounded electrical corrective device.

The term $$I_{2un} = I_{2un} = [Y_{10C}V_1 + Y_{11C}V_2 + Y_{12C}V_0] \times \left| \frac{I_1}{V_1 Y_{11C}} \right|;$$

and $$Y_{11C} = g_{11}I_{1C} + g_{12}I_{2C} + g_{13}I_{0C},$$

$$Y_{12C} = g_{12}I_{1C} + g_{13}I_{2C} + g_{11}I_{0C},$$

$$Y_{10C} = g_{13}I_{1C} + g_{11}I_{2C} + g_{12}I_{0C};$$

and $$g_{11} = \frac{(V_{1C})^2 - V_{2C}V_{0C}}{(V_{1C})^3 + (V_{2C})^3 + (V_{0C})^3 - 3V_{1C}V_{2C}V_{0C}},$$

$$g_{12} = \frac{(V_{2C})^2 - V_{1C}V_{0C}}{(V_{1C})^3 + (V_{2C})^3 + (V_{0C})^3 - 3V_{1C}V_{2C}V_{0C}},$$

$$g_{13} = \frac{(V_{0C})^2 - V_{1C}V_{2C}}{(V_{1C})^3 + (V_{2C})^3 + (V_{0C})^3 - 3V_{1C}V_{2C}V_{0C}};$$

for a grounded electrical corrective device.

In another general aspect, a method is performed for detecting imbalances in an electrical corrective device connected to an electric power system. The method includes measuring a current $I_A$, $I_B$, and $I_C$ between each phase of the electric power system and the electrical corrective device; calculating a negative-sequence current $I_2$ on the basis of the currents $I_A$, $I_B$, and $I_C$; determining a predetermined negative-sequence current $I_{2un}$ of an undamaged electrical corrective device; calculating a negative-sequence current difference by comparing the calculated negative-sequence current $I_2$ with the predetermined negative-sequence current $I_{2un}$; and de-energizing the electrical corrective device if $I_2$-$I_{2un}$ exceeds a predetermined threshold.

For many applications, a double wye form of bank construction is employed. However, this form of bank construction may require more space to install and may be more expensive to fabricate than other configurations, such as a single wye configuration. The described control system and method allows the bank to be configured in a single wye without losing benefits of the double wye construction, and thereby reduces the mounting space in the substation and further lowers the overall cost of the bank.

For single wye systems, the inclusion of a neutral-ground measuring device such as a voltage transducer (for ungrounded banks) or a neutral-ground current transducer (for grounded banks) may be undesirable from a cost and reliability standpoint. The control system and method described below provide comparable degrees of bank protection, but eliminate the need for the neutral-ground measuring devices.

The described control system and method also provides a way of determining an internal imbalance in the bank without making a measurement internal to the bank. Such an internal imbalance determination is not possible by just measuring an output of the bank.

Other features will be apparent from the description, the drawings, and the claims.

DESCRIPTION OF DRAWINGS

Like reference symbols in the various drawings may indicate like elements.

DETAILED DESCRIPTION

Corrective devices such as reactor and capacitor banks can be connected in a "shunt" configuration (i.e., a line-neutral arrangement) rather than in a series, or in-line, connection. As a shunt-connected device, the bank may be grounded (i.e., such that the bank neutral point is connected to the power system ground with an intentionally low impedance tie) or ungrounded (i.e., such that there is no intentional connection between the bank neutral point and system ground).

Once the bank is energized, external protective systems are employed to ensure the voltages within the bank are acceptable so as not to overly stress individual reactor or capacitor components of the bank. This is of particular concern in capacitor banks that include dozens of interconnected individual components. If an individual component within the bank fails, internal bank voltages would be altered and increase across the remaining functioning units. If this elevated voltage stress is not detected, and, when necessary, the entire bank is not de-energized in response, internal cascading and often catastrophic failures may result. One way to determine whether potentially damaging voltage levels exist is to measure the voltage stress across each internal component within the bank. However, this may be impractical due to the large number of components. Existing protection systems therefore employ indirect measurements, using voltages external to the bank and possibly current flow through the bank, in conjunction with well-understood equations, to estimate internal voltage levels.

For ungrounded banks, the failure of an individual component creates an imbalance that leads to elevated voltage stress within the bank, as mentioned above. This imbalance manifests as a shift in the neutral-ground voltage. By employing a voltage transducer at the neutral-to-ground location, the neutral voltage can be measured, and a protective system can be used to estimate the magnitude of internal voltage stress.

For grounded banks, the failure of an individual component also creates an imbalance that leads to elevated voltage stress within the bank. This imbalance manifests as a shift in the neutral-ground current. By employing a current transducer at the neutral-to-ground location, the neutral current can be measured, and a protective system can be used to estimate the magnitude of internal voltage stress. Regardless of the grounding configuration, the magnitude of estimated internal voltage stress is compared to thresholds, with time delays, to determine if and when the bank must be switched off from the power system.

Figure 1:
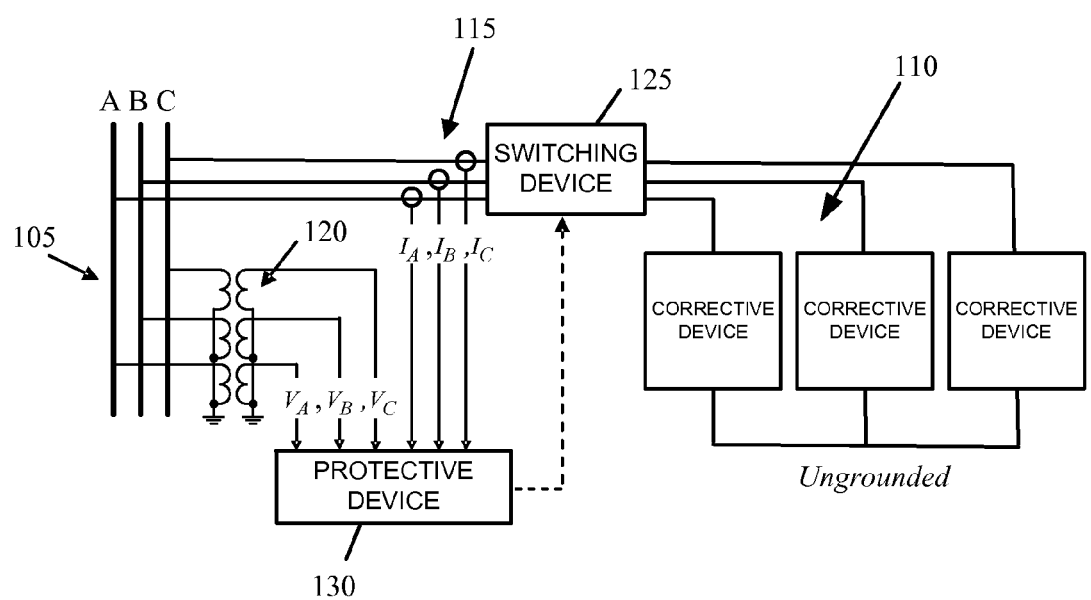
FIG. 1 is a diagram of a control system including an ungrounded corrective device.
Figure 2:
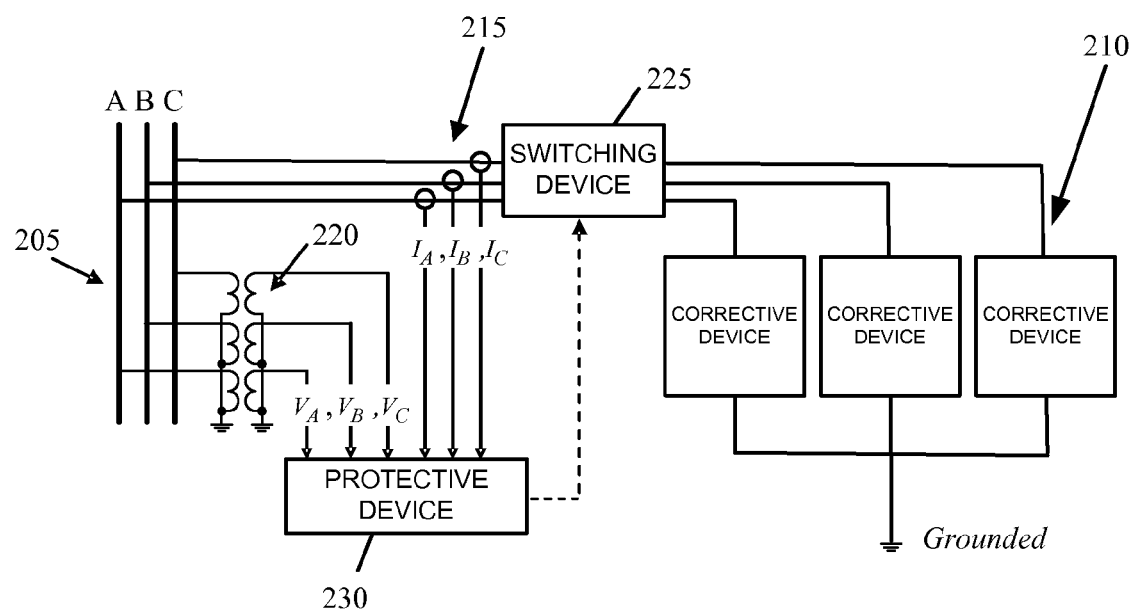
FIG. 2 is a diagram of a control system including a grounded corrective device.

Referring to FIGS. 1 and 2, a control system 100 or 200 detects abnormalities such as imbalances within ungrounded (FIG. 1) or grounded (FIG. 2) reactor or capacitor banks that are shunt-connected to an electric power system. The control systems 100 or 200 determine whether potentially damaging voltage levels exist without having to measure the voltage stress across one or more internal components within the bank, that is, independently of the voltage stress across one or more internal components within the bank and without use of a neutral-ground measuring device at the bank.

As noted above, in existing systems, when an ungrounded bank is arranged in a single electrical wye, the voltage between the ungrounded neutral of the bank and the power system ground is monitored. If the bank is arranged in a double wye, then either the current flowing between the neutral points of the two wyes (the "neutral-to-neutral current") or the neutral-ground voltage is monitored. Typically, these signals are measured with a separate voltage or current transducer, which is an additional component of the power system that raises both procurement and operational costs, and may reduce reliability. Once quantified, the neutral-ground voltage or the neutral-to-neutral current is used to detect when potentially damaging imbalance conditions occur within the bank. Referring in particular to FIG. 1, in the control system 100, electrical signals external to the bank are still employed. However, these voltage and current signals are typically available for other metering and backup protection functions.

The control system 100 is designed for a three-phase (A, B, C) power system and includes a three-phase, high-voltage bus 105 shown at the connection point to a three-phase, ungrounded shunt reactor or capacitor bank 110. The system 100 also includes three current measuring devices such as current transducers 115 that provide currents $I_A$, $I_B$, and $I_C$ flowing from each phase of the bus 105 to the shunt bank 110. The current measurements provided by the transducers 115, in addition to being used by the control system 100, also may be used by metering equipment and backup protection in other parts of the power system.

The control system 100 also includes voltage measuring devices such as voltage transducers 120 that provide voltages $V_A$, $V_B$, and $V_C$ taken from each phase to ground for each phase of the bus 105. The voltage measurements provided by the voltage transducers 120, in addition to being used by the control system 100, also may be used by metering equipment and backup protection in other parts of the power system.

The control system 100 includes a switching device 125 that is used to connect the bank 110 to the power system as needed as well as to remove the bank 110 from service when damaging imbalances are detected within the system 100. The control system 100 also includes a computerized protective device 130 that performs calculations based on the measured values $V_A$, $V_B$, $V_C$, $I_A$, $I_B$, and $I_C$. The device 130 outputs a decision in the form of a control signal that is sent to the switching device 125 such that the bank 110 may be de-energized when damaging imbalances are detected. In some implementations, the protective device 130 may be a component of the switching device 125.

Referring to FIG. 2, a control system 200 for a three-phase (A, B, C) power system includes a three-phase, high-voltage bus 205 shown at the connection point to a three-phase, grounded shunt reactor or capacitor bank 210. Like the system 100, the system 200 includes three current measuring devices, such as current transducers 215 that provide currents $I_A$, $I_B$, and $I_C$ flowing from each phase of the bus 205 to the shunt bank 210. The control system 200 also includes voltage measuring devices, such as voltage transducers 220, that provide voltages $V_A$, $V_B$, and $V_C$ taken from each phase to ground for each phase of the bus 205.

The control system 200 includes a switching device 225 that is similar to the switching device 125 and is also used to connect the shunt bank 210 to the power system as needed as well as to remove the bank 210 from service when damaging imbalances are detected within the system 200. The control system 200 includes a computerized protective device 230 that performs calculations based on the measured values $V_A$, $V_B$, $V_C$, $I_A$, $I_B$, and $I_C$ in a similar manner as the device 130.

In both of systems 100 and 200, the protective device 130 or 230 calculates positive-sequence, negative-sequence, and zero-sequence device currents $I_1$, $I_2$, and $I_0$, respectively, and positive-sequence, negative-sequence, and zero-sequence voltages $V_1$, $V_2$, and $V_0$, respectively, on the basis of the phase currents $I_A$, $I_B$, and $I_C$ and the phase-to-ground voltages $V_A$, $V_B$, and $V_C$ of the bank 110 or 210 using the following relationships:

$$I_1 = \frac{1}{3} \times (I_A + aI_B + a^2 I_C)$$

$$I_2 = \frac{1}{3} \times (I_A + a^2 I_B + aI_C)$$

$$I_0 = \frac{1}{3} \times (I_A + I_B + I_C)$$

$$V_1 = \frac{1}{3} \times (V_A + aV_B + a^2 V_C)$$

$$V_2 = \frac{1}{3} \times (V_A + a^2 V_B + aV_C)$$

$$V_0 = \frac{1}{3} \times (V_A + V_B + V_C)$$

where:

$$a = -\frac{1}{2} + j\frac{\sqrt{3}}{2}$$

is the Fortescue operator.

The protective device 130 or 230 performs a negative-sequence current difference calculation for imbalance protection of three-phase reactive devices connected in a single-wye configuration. The calculation is based on a comparison of the bank calculated negative-sequence current $I_2$ (determined above based on the bank phase currents) with a predetermined negative-sequence current of the undamaged bank, $I_{2un}$. The negative-sequence current $I_{2un}$ is calculated as if asymmetry exists only because of an external (system) voltage imbalance and/or because of the inherent phase imbalance due to manufacturing tolerance (i.e., not all phases of the bank include identical amounts of reactance). The vector difference $I_{UN}$ between the calculated signal $I_2$ and the predetermined negative-sequence current $I_{2un}$ is proportional to the internal asymmetry of a protected bank due to internal faults (unit failures):

$$I_{UN} = I_2 - I_{2un}$$

An internal fault that requires action such as de-energizing the entire bank exists when the vector difference $I_{UN}$ exceeds a predetermined threshold. As seen in the above equations, $I_2$ is calculated based on measured bank phase currents $I_A$, $I_B$, and $I_C$. The measured signal $I_2$ may include the effects of false imbalance due to either imbalance bus voltages, inherent imbalances in the bank due to manufacturing tolerances, or variations in the bank's electrical properties (such as admittance) due to changes in ambient temperature. The negative-sequence current term $I_{2un}$ removes any such error signals from the calculated signal $I_2$ and is calculated as shown below based on the bank being either ungrounded or grounded.

Calculation of $I_{2un}$ for an Ungrounded Bank

The predetermined negative-sequence current $I_{2un}$ is calculated on the basis of measured positive-sequence and negative-sequence voltages at the bank terminals $V_1$ and $V_2$, as well as on the basis of the measured positive-sequence bank current $I_1$:

$$I_{2un} = \begin{bmatrix} (G_{21C} + jB_{21C})V_1 + \\ (G_{11C} + jB_{11C})V_2 \end{bmatrix} \times \left| \frac{I_1}{V_1 \sqrt{G_{11C}^2 + B_{11C}^2}} \right|,$$

where $G_{11C}+jB_{11C}$ and $G_{21C}+jB_{21C}$ are elements of the sequence admittance matrix of the bank 110 or 210 existing when the bank was being commissioned. These values are kept in non-volatile memory of the protective device 130 or 230. In the notation above, as well as in that to follow, the subscript "C" denotes measured or derived quantities available when the bank is commissioned or initially placed in service.

The matrix elements can be calculated on the basis of a positive-sequence voltage $V_{1C}$, a negative-sequence voltage $V_{2C}$, a positive-sequence current $I_{1C}$, and a negative-sequence current $I_{2C}$ that were measured when the bank 110 or 210 was commissioned. Assuming that the phasor $V_{1C}$ coincides with the real axis, the measured symmetrical components can be presented in algebraic form as follows:

$$V_{1C} = V_{1C}, V_{2C} = V_{2rC} + jV_{2iC},$$

$$I_{1C} = I_{1rC} + jI_{1iC}, I_{2C} = I_{2rC} + jI_{2iC},$$

The subscripts "i" and "r" denote, respectively, the imaginary and real parts of the measured components, and $V_{1C}$, $V_{2rC}$, $V_{2iC}$, $I_{1rC}$, $I_{1iC}$, $I_{2rC}$, and $I_{2iC}$ are real numbers.

The parameters $G_{11C}$, $B_{11C}$, $G_{21C}$ and $B_{21C}$ an be derived from the following equations:

$$G_{11C} = \frac{V_{1C}I_{1rC} + V_{2rC}I_{2rC} + V_{2iC}I_{2iC}}{V_{1C}^2 + (V_{2rC}^2 + V_{2iC}^2)},$$

$$B_{11C} = \frac{V_{1C}I_{1iC} + V_{2iC}I_{2rC} - V_{2rC}I_{2iC}}{V_{1C}^2 - (V_{2rC}^2 + V_{2iC}^2)},$$

$$G_{21C} = \frac{I_{2rC} - G_{11C}V_{2rC} + B_{11C}V_{2iC}}{V_{1C}},$$

$$B_{21C} = \frac{I_{2iC} - G_{11C}V_{2iC} - B_{11C}V_{2rC}}{V_{1C}}.$$

As an additional benefit of these techniques, the negative-sequence current of the undamaged bank $I_{2un}$ takes into account changes of the bank reactance with temperature. In particular, the $$\left| \frac{I_1}{V_1 \sqrt{G_{11C}^2 + B_{11C}^2}} \right|$$

term of the equation used to determine $I_{2un}$ performs automatic temperature compensation. This benefit is most desired when protecting shunt capacitor banks that exhibit a pronounced temperature dependency. Without the temperature compensation, the techniques could yield false imbalance signals, possibly leading to undesired de-energizing of the bank, occurring under large variations of ambient temperature.

Calculation of $I_{2un}$ for a Grounded Bank

The predetermined negative-sequence current $I_{2un}$ is calculated on the basis of measured positive, negative, and zero-sequence voltages at the bank terminals ($V_1$, $V_2$, and $V_0$) as well as on the basis of measured positive-sequence bank current $I_1$:

$$I_{2un} = I_{2un} = [Y_{10C}V_1 + Y_{11C}V_2 + Y_{12C}V_0] \times \left| \frac{I_1}{V_1 Y_{11C}} \right|$$

The "C" subscript indicates quantities measured or calculated when the bank is initially placed into service. This equation accounts for deviations of matrix elements from the measured ones during the bank commissioning that may take place due to temperature variations by including the factor $$\left| \frac{I_1}{V_1 Y_{11C}} \right|.$$

The $Y_{nn}$ elements appearing above are calculated using the expression $$Y_{11C} = g_{11}I_{1C} + g_{12}I_{2C} + g_{13}I_{0C},$$

$$Y_{12C} = g_{12}I_{1C} + g_{13}I_{2C} + g_{11}I_{0C},$$

$$Y_{10C} = g_{13}I_{1C} + g_{11}I_{2C} + g_{12}I_{0C};$$

The $g_{nn}$ elements appearing above are calculated using the expression $$g_{11} = \frac{(V_{1C})^2 - V_{2C}V_{0C}}{(V_{1C})^3 + (V_{2C})^3 + (V_{0C})^3 - 3V_{1C}V_{2C}V_{0C}},$$

$$g_{12} = \frac{(V_{2C})^2 - V_{1C}V_{0C}}{(V_{1C})^3 + (V_{2C})^3 + (V_{0C})^3 - 3V_{1C}V_{2C}V_{0C}},$$

$$g_{13} = \frac{(V_{0C})^2 - V_{1C}V_{2C}}{(V_{1C})^3 + (V_{2C})^3 + (V_{0C})^3 - 3V_{1C}V_{2C}V_{0C}}.$$

Determination of Faulted Phase

When elevated levels of $I_{UN}$ indicate a unit failure internal to the bank, the protective device 130 or 230 may command the switching device 125 or 225 to de-energize the bank to prevent voltage stress on the bank's remaining healthy elements. To aid in identifying the failed unit(s) for replacement, it is helpful to not merely indicate the existence of an imbalance problem but also to isolate the failure to the involved phase, that is, A, B, or C. Referring to the table below, for example, the angular relationship between $I_{UN}$ and $V_1$ complex values for a capacitor bank shows in which phase the imbalance has occurred as detailed in the table below.

| Phase with failed capacitor elements or capacitor units | Phase angle φ of the imbalance current $I_{UN}$ related to the voltage $V_1$ [Degrees] | |
|---|---|---|
| | Fused Capacitors | Fuseless Capacitors |
| A | $-80° < \phi < -100°$ | $80° < \phi < 100°$ |
| B | $20° < \phi < .40°$ | $-140° < \phi < -160°$ |
| C | $140° < \phi < 160°$ | $-20° < \phi < -40°$ |

These relationships can be determined for reactor banks also.

Other implementations are within the scope of the following claims.

What is claimed is:

1. A method comprising:
   measuring a voltage of each phase of a multi-phase electric power system;
   measuring a current between each phase of the multi-phase electric power system and an electrical corrective device; and
   determining whether an imbalance exists in the electrical corrective device using the measured voltage and the measured current, the determination being independent of a voltage across a component included in the electrical corrective device and independent of a neutral-ground measurement at the electrical corrective device.

2. The method of claim 1, wherein the electrical corrective device includes a reactor bank.

3. The method of claim 1, wherein the electrical corrective device includes a capacitor bank.

4. The method of claim 1, wherein determining whether an imbalance exists comprises determining a negative-sequence current using the measured values and comparing the negative-sequence current with a predetermined negative-sequence current calculated for an undamaged electrical corrective device.

5. The method of claim 1, wherein the electrical corrective device is shunt connected.

6. The method of claim 5, wherein the electrical corrective device is ungrounded.

7. The method of claim 6, wherein the electrical corrective device includes a bank of elements that are arranged in a wye configuration.

8. The method of claim 1, wherein the electrical corrective device is ungrounded.

9. The method of claim 1, wherein the electrical corrective device is grounded.

10. The method of claim 1, wherein an imbalance exists in the electrical corrective device, and further comprising activating a switching device configured to isolate the electrical corrective device from the electric power system.

11. The method of claim 1, wherein determining whether an imbalance exists includes compensating for errors in the measured voltage and measured current due to ambient temperature changes.

12. The method of claim 1, wherein an imbalance exists in the electrical corrective device, and further comprising determining in which phase the imbalance occurs.

13. The method of claim 1, wherein the electrical corrective device is connected to a multi-phase high-voltage bus of the electric power system, the electrical corrective device includes multiple interconnected individual capacitive or reactive components, and determining whether an imbalance exists is independent of a voltage across one or more of the interconnected components included in the electrical corrective device.

* * * * *